(No Model.)

J. HORNSBY, J. INNOCENT & J. H. SMITH.
HARVESTER.

No. 460,139. Patented Sept. 29, 1891.

Witnesses,
B. W. Miller
Baltus D. Long.

Inventors
James Hornsby
John Innocent
John H. Smith
by their attorneys
Baldwin, Davidson & Wight

UNITED STATES PATENT OFFICE.

JAMES HORNSBY, JOHN INNOCENT, AND JOHN HENRY SMITH, OF GRANTHAM, ENGLAND, ASSIGNORS TO RICHARD HORNSBY & SONS, LIMITED, OF SAME PLACE.

HARVESTER.

SPECIFICATION forming part of Letters Patent No. 460,139, dated September 29, 1891.

Application filed January 17, 1891. Serial No. 377,503. (No model.) Patented in France July 10, 1890, No. 206,902.

*To all whom it may concern:*

Be it known that we, JAMES HORNSBY, JOHN INNOCENT, and JOHN HENRY SMITH, engineers, subjects of the Queen of Great Britain, all residing at the Spittlegate Iron Works, Grantham, in the county of Lincoln, England, jointly have invented a certain new and useful Improvement in Harvesting-Machines, (for which we have received Letters Patent in France, No. 206,902, dated July 10, 1890,) of which the following is a specification.

Our invention relates to the endless apron platform carriers or elevators now so generally employed in harvesters; and its object is to maintain automatically a uniform tension upon both sides of said bands or aprons, which end we attain by mounting one of the rollers traversed by the endless apron in spring-bearings, maintained in proper relation by racks thereon engaging pinions turning with a shaft fixed on the platform-frame, substantially as hereinafter described and claimed.

The accompanying drawings represent so much apparatus only as is necessary to illustrate the subject-matter claimed adapted to the platform-apron of a harvester, Figure 1 being a plan; Fig. 2, a horizontal section in the plane of the axis of the rollers; Fig. 3, a side view, and Fig. 4 a plan, of the rack-and-pinion mechanism. Figs. 2, 3, and 4 are on an enlarged scale.

Unless otherwise indicated, the parts are of well-known and approved construction.

The drawings show guard-fingers $p$, fixed on the front of a platform-frame $o$. The crop as it is cut falls upon an endless band or platform-carrier, (not shown,) one end of which passes around a roller $q$, turning on stud-axles carried in bearings $r'$ at the outer ends of bars having stems $r^2$, which pass endwise through fixed guides $s$ on the frame, and are surrounded by coiled springs $t$, abutting thereupon and also upon shoulders on the bars. These springs are compressed and tend to force the rollers which carry the endless aprons or bands apart, and thus keep the bands tightly strained. Slots $r^3$, formed in these bars, carry racks $r^4$ on one side. Pinions $u$, mounted on a shaft $u'$, turning in fixed bearings in the frame, engage with these racks and serve as guides for the apron-roller. The two gears, being fast on the same shaft or axis, must necessarily turn together and move the bars equally on each side. The apron-roller $q$ consequently always remains parallel with the opposite roller traversed by the endless band, notwithstanding variations in their distance apart. The shaft $u'$ is preferably constructed with a tubular center and solid ends inserted therein and held by cross-pins, which renders the parts easy to make and allows a slight play of the shaft.

Under the above-described organization it will be seen that the apron-roller is mounted on short axles carried in sliding bars automatically moved by springs, and the carrying-gears $u$ simply turn on separate axles from the roller in a fixed position, being free at all times to move in either direction, their function being simply to preserve the parallelism of the two ends of the apron-roller and to act as guides therefor.

The endless band or apron completely covers all the parts and protects them from entanglement with the crop, and as the bars and springs are inside of the frame they can be of any length desired.

What we claim as new and as of our own invention is—

The combination, substantially as hereinbefore set forth, of a roller which carries one end of the endless apron of a harvester, its stud-axles turning in bearings in parallel bars, guides on the frame on which said bars traverse longitudinally, springs which automatically force the roller forward, an axle turning in fixed bearings on the frame and passing through slots in the bars, and racks on said bars gearing with pinions on the axle, free to turn at all times and serving as guides for the apron-roller.

JAMES HORNSBY.
JOHN INNOCENT.
J. H. SMITH.

Witnesses:
A. H. DARNILL,
F. J. WOOD.